(12) United States Patent
Azegami et al.

(10) Patent No.: US 9,616,507 B2
(45) Date of Patent: Apr. 11, 2017

(54) REPLACEABLE HEAD CUTTING TOOL (71) Applicant: MITSUBISHI MATERIALS CORPORATION, Tokyo (JP)

(72) Inventors: Takayuki Azegami, Akashi (JP); Tarou Abe, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 55 days.

(21) Appl. No.: 14/385,277

(22) PCT Filed: Mar. 13, 2013

(86) PCT No.: PCT/JP2013/056900
§ 371 (c)(1),
(2) Date: Sep. 15, 2014

(87) PCT Pub. No.: WO2013/146236
PCT Pub. Date: Oct. 3, 2013

(65) Prior Publication Data
US 2015/0037108 A1    Feb. 5, 2015

(30) Foreign Application Priority Data

Mar. 26, 2012   (JP) ................................ 2012-070394

(51) Int. Cl.
*B23C 5/22*   (2006.01)
*B23C 5/10*   (2006.01)
*B21K 25/00*  (2006.01)

(52) U.S. Cl.
CPC ................ *B23C 5/22* (2013.01); *B21K 25/00* (2013.01); *B23C 5/10* (2013.01); *B23C 2210/02* (2013.01);
(Continued)

(58) Field of Classification Search
CPC ... B23C 5/22; B23C 2210/02; B23C 2210/03; B23C 2270/06; B23P 11/02
See application file for complete search history.

(56) References Cited

U.S. PATENT DOCUMENTS 4,152,821 A   5/1979   Scott
4,653,969 A   3/1987   Summerlin et al.
(Continued)

FOREIGN PATENT DOCUMENTS

GB   2059838 A      4/1981
JP   60-145206 U    9/1985
(Continued)

OTHER PUBLICATIONS

Extended European Search Report mailed Oct. 5, 2015 for the corresponding European Application No. 13767791.0.
(Continued)

*Primary Examiner* — Daniel Howell
*Assistant Examiner* — Ryan Rufo
(74) *Attorney, Agent, or Firm* — Leason Ellis LLP (57) ABSTRACT

A replaceable head cutting tool increases the strength of engagement between a tool body and a coupling member without causing damage. A cylindrical mounting unit of the coupling member which is made of a metal having hardness lower than the hardness of the tool body, is inserted into a mounting hole having a concave portion formed on the inner surface of the tool body. The mounting unit is plastically deformed so as to increase in diameter, and the outer peripheral surface of the mounting unit contacts the inner peripheral surface of the mounting hole and is engaged with the concave portion which includes a first wall surface that is inclined toward the outer peripheral side as it moves in an insertion direction of the mounting unit, and a second wall
(Continued)

surface that is inclined toward the inner peripheral side as it moves in the insertion direction.

10 Claims, 4 Drawing Sheets

(52) U.S. Cl.
CPC ...... *B23C 2210/03* (2013.01); *B23C 2240/32* (2013.01); *B23C 2270/06* (2013.01); *Y10T 407/22* (2015.01)

(56) References Cited

U.S. PATENT DOCUMENTS

| | | | |
|---|---|---|---|
| 4,844,517 | A | 7/1989 | Beiley et al. |
| 5,899,642 | A * | 5/1999 | Berglow ................ B23B 31/11 279/8 |
| 6,244,808 | B1 | 6/2001 | Donhauser |
| 6,905,278 | B2 * | 6/2005 | Kress ................ B23B 31/1107 279/7 |
| 7,004,692 | B2 * | 2/2006 | Hecht ................ B23B 31/008 279/8 |
| 7,611,311 | B2 * | 11/2009 | Kakai ................ B23B 31/1107 279/8 |
| 8,439,369 | B2 | 5/2013 | Haimer |
| 8,944,732 | B2 * | 2/2015 | Osawa ................ B23B 31/005 408/226 |
| 2008/0304923 | A1 | 12/2008 | Lehto et al. |
| 2010/0247263 | A1 | 9/2010 | Azegami et al. |
| 2014/0234035 | A1 * | 8/2014 | Azegami ................ B23C 5/10 407/34 |
| 2014/0308082 | A1 * | 10/2014 | Abe ................ B23B 31/1122 407/37 |

FOREIGN PATENT DOCUMENTS

| | | |
|---|---|---|
| JP | 61-013011 A | 1/1986 |
| JP | 05-094515 U | 12/1993 |
| JP | 2007-290120 A | 11/2007 |
| JP | 2009-298279 A | 12/2009 |
| JP | 2011-143532 A | 7/2011 |
| WO | WO-2008/015735 A | 2/2008 |

OTHER PUBLICATIONS

International Search Report mailed May 7, 2013 for the corresponding PCT Application No. PCT/JP2013/056900.
Notice of Allowance mailed Feb. 2, 2016 for the corresponding Japanese Patent Application No. 2012-070394.
Office Action mailed Nov. 1, 2016 for the related Japanese Patent Application No. 2015-254226.

* cited by examiner

REPLACEABLE HEAD CUTTING TOOL

CROSS-REFERENCE TO RELATED PATENT APPLICATIONS

This application is a U.S. National Phase Application under U.S.C. §371 of International Patent Application No. PCT/JP2013/056900, filed Mar. 13, 2013, and claims the benefit of Japanese Patent Application No. 2012-070394, filed on Mar. 26, 2012, all of which are incorporated by reference in their entirety herein. The International Application was published in Japanese on Oct. 3, 2013 as International Publication No. WO/2013/146236 under PCT Article 21(2).

FIELD OF THE INVENTION

The present invention relates to a cutting head that is coupled to a holder including a cutting edge portion, and a replaceable head cutting tool, such as a holder, to which the cutting head is coupled and which holds the cutting head.

BACKGROUND OF THE INVENTION

JP-A-2011-143532 discloses a replaceable cutting head, which is detachably mounted by being inserted into a mounting hole formed in a holder and by being threadedly attached to a mounting screw portion, as this replaceable head cutting tool. The replaceable cutting head includes a cutting head body and a coupling member. The cutting head body is made of a hard material, and includes a cutting edge portion that is provided at a front end portion, a mounting unit that is formed at a rear end portion and is inserted into the mounting hole, and a coupling hole that includes an inner peripheral surface on which a concave portion is formed. The coupling member is made of a metal material having hardness lower than the hardness of the hard material. The coupling member includes a front end shaft portion, a head screw portion, and a hole portion. The front end shaft portion is inserted into the coupling hole and the outer peripheral surface of the front end shaft portion comes into close contact with the inner peripheral surface of the coupling hole, so that the front end shaft portion is engaged with the coupling hole. The head screw portion is threadedly attached to the mounting screw portion. The hole portion is formed in the head screw portion and the front end shaft portion along the center line of the front end shaft portion. The coupling member is coupled to the cutting head body.

After the front end shaft portion of the coupling member is inserted into the coupling hole of the cutting head body, a punch of which an outer diameter is slightly larger than the inner diameter of the hole portion is press-fitted into the hole portion of the coupling member. Accordingly, the front end shaft portion of the coupling member is plastically deformed so as to increase in diameter, and the outer peripheral surface of the front end shaft portion penetrates into and is engaged with the concave portion of the inner peripheral surface of the coupling hole. As a result, the cutting head body and the coupling member of the replaceable cutting head are integrated with each other. Here, JP-A-2011-143532 discloses an example in which annular grooves are formed on the inner peripheral surface of the coupling hole of the cutting head body as the concave portion, and the concave portion has the shape of a substantially circular arc in a cross-section taken along the center line in FIG. 3 of JP-A-2011-143532.

Technical Problem

However, in the case of the concave portion having a circular arc-shaped cross-section, the depth of the concave portion is also increased when the width of the concave portion in the direction of the center line is increased so that the outer peripheral surface of the front end shaft portion of the coupling member penetrates further into the concave portion in order to increase the strength of engagement between the cutting head body and the coupling member. Accordingly, when the punch is press-fitted, when the head screw portion of the coupling member is threadedly attached to the mounting screw portion of the holder, when the replaceable cutting head mounted on the holder, as described above, is used for cutting and a cutting load is applied to the replaceable cutting head, or the like, there is a concern that cracks are generated from the bottom of the concave portion in the cutting head body, which also has a strong tendency of brittleness since it is made of a hard material, and the cutting head body is damaged.

Meanwhile, when the depth of the concave portion is not changed and a concave portion, of which the length in a direction of the center line of a circular arc is lengthened and which has a semi-oval cross-section, is formed, the amount of plastic deformation of the outer peripheral surface of the front end shaft portion is increased. However, when the punch is press-fitted to plastically deform the front end shaft portion of the coupling member, the outer peripheral surface of the front end shaft portion, which is plastically deformed significantly, is excessively and firmly caught by the wall surface of the concave portion that is formed on the side toward which the punch is press-fitted. For this reason, there is a concern that a load applied to the punch toward the rear side in the press-fitting direction is increased and the breakage of the punch occurs. Further, since the inner peripheral surface of the coupling hole of the cutting head body is notched largely in the direction of the center line, there is a concern that the strength of the cutting head body may also deteriorate and the cutting head body may be damaged.

The invention has been made in consideration of the background, and an object of the invention is to provide a replaceable head cutting tool that can increase the strength of engagement between a tool body and a coupling member without causing damage to a tool body, such as a head body or a holder, which also has a strong tendency of having brittleness since being made of a hard material, or the breakage of a punch.

SUMMARY OF THE INVENTION

Technical Solution

To solve the above-mentioned problems and to achieve the object, according to an aspect of the invention, there is provided a replaceable head cutting tool in which a cylindrical mounting unit of a coupling member, which is made of a metal material having hardness lower than the hardness of a hard material of a tool body, is inserted into a mounting hole, which is formed in the tool body made of the hard material and includes a concave portion formed on an inner peripheral surface thereof, the mounting unit is plastically deformed so as to increase in diameter, and an outer peripheral surface of the mounting unit comes into close contact with the inner peripheral surface of the mounting hole and is engaged with the concave portion, so that the tool body and the coupling member are joined to each other. The concave portion includes a first wall surface that is inclined toward an outer peripheral side as the first wall surface moves in an insertion direction in which the mounting unit is inserted into the mounting hole, and a second wall surface that is opposite to the first wall surface and is inclined toward an inner peripheral side as the second wall surface moves in the insertion direction. A first inclination angle, which is formed between the first wall surface and a plane perpendicular to a center line of the mounting hole at a position where the first wall surface intersects with the inner peripheral surface of the mounting hole, is smaller than a second inclination angle, which is formed between the second wall surface and a plane perpendicular to the center line at a position where the second wall surface intersects with the inner peripheral surface of the mounting hole.

In the replaceable head cutting tool having this structure, the insertion direction in which the mounting unit is inserted into the mounting hole of the tool body is the press-fitting direction of the punch when the mounting unit of the coupling member is plastically deformed so as to increase in diameter. However, the first inclination angle formed between the first wall surface of the concave portion, which is inclined toward the outer peripheral side as the first wall surface moves toward the insertion direction, and the center line of the mounting hole, is smaller than the second inclination angle formed between the second wall surface, which is opposite to the first wall surface and is inclined toward the inner peripheral side as the second wall surface moves in the insertion direction, and the plane. Accordingly, an inclination angle formed between the second wall surface and the center line of the mounting hole or the inner peripheral surface is smaller than an inclination angle formed between the first wall surface and the center line of the mounting hole or the inner peripheral surface.

For this reason, when the first inclination angle, which is formed between the first wall surface and the plane perpendicular to the center line of the mounting hole at the position where the first wall surface intersects with the inner peripheral surface of the mounting hole, is the same as that of the concave portion of the replaceable head cutting tool disclosed in JP-A-2011-143532, the width of the concave portion in the direction of the center line can be increased as much as an inclination of the second wall surface relative to the center line becomes gentle even though the depth of the concave portion is constant. Accordingly, it is possible to increase the amount of plastic deformation of the outer peripheral surface of the mounting unit when the punch is press-fitted. Further, notched portions of the tool body can also be made small as compared to a case in which the concave portion is formed to have a semi-oval cross-section.

Furthermore, since the inclination of the second wall surface, which is positioned on the side toward which the punch is press-fitted in the press-fitting direction, relative to the inner peripheral surface of the mounting hole is gentle, as described above, the outer peripheral surface of the mounting unit, which has been plastically deformed significantly, as described above, is not firmly caught by the second wall surface and a load applied to the punch toward the rear side in the press-fitting direction is suppressed to be a small load. Accordingly, it is possible to prevent the breakage of the punch from occurring. Further, since the inclination of the first wall surface, which is positioned on the rear side of the second wall surface in the insertion direction in which the mounting unit is inserted into the mounting hole, relative to the center line and the inner peripheral surface of the mounting hole is large, the first wall surface is firmly caught by the outer peripheral surface of the mounting unit that has been plastically deformed significantly. Accordingly, it is possible to increase the strength of engagement and to increase a resistance force against the extraction of the coupling member.

Here, it is preferable that the second inclination angle be set to 45° or more. When the second inclination angle is smaller than 45°, the inclination of the second wall surface relative to the hole center line or the inner peripheral surface of the mounting hole is increased. Accordingly, the catch of the outer peripheral surface of the mounting unit, which has been plastically deformed at the time of the press-fitting of the punch, on the second wall surface is excessively increased. For this reason, there is a concern that the breakage of the punch cannot be reliably prevented. However, since the second wall surface is inclined toward the inner peripheral side as the second wall surface moves in the insertion direction in which the mounting unit is inserted into the mounting hole, the second inclination angle does not exceed 90°.

Meanwhile, the second wall surface may have the shape of a straight line in a cross-section taken along the center line of the mounting hole and intersect with the inner peripheral surface of the mounting hole, and may have the shape of a curve convex toward the inner peripheral side of the mounting hole in the cross-section. In this case, it is possible to further reduce the catch of the outer peripheral surface of the plastically deformed mounting unit.

Further, it is preferable that the first inclination angle be set to 45° or less. When the first inclination angle is increased to over 45°, the inclination of the first wall surface relative to the center line and the inner peripheral surface of the mounting hole is excessively reduced. For this reason, there is a concern that the strength of engagement cannot be reliably increased. However, since the first wall surface is inclined toward the outer peripheral side as the first wall surface moves in the insertion direction in which the mounting unit is inserted into the mounting hole, the first inclination angle is not smaller than 0° and does not have a negative value. That is, the first wall surface is not inclined toward the inner peripheral side at a position where the first wall surface intersects with the inner peripheral surface of the mounting hole as the first wall surface moves in the insertion direction.

Advantageous Effects

As described above, according to the invention, since it is possible to increase the strength of engagement between the tool body and the coupling member while preventing damage to the tool body, the breakage of the punch at the time of press-fitting, and the like, it is possible to reliably prevent the coupling member from being extracted from the tool body.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

EXPLANATION OF REFERENCE

1: head body (tool body)
1A: head body material
2: coupling member
11: cutting edge portion
12: engagement portion
13: tapered shaft portion
16: mounting hole
17: annular groove (concave portion)
17a: first wall surface
17b: second wall surface
21: mounting unit
22: male screw portion
O: center line of mounting hole 16
S: plane perpendicular to center line O
P: punch
F: press-fitting direction (insertion direction in which mounting unit 21 is inserted into mounting hole 16)
w: width of annular grooves 17 (concave portion) in direction of center line O
h: the amount of plastic deformation
α: first inclination angle
β: second inclination angle

DETAILED DESCRIPTION OF THE INVENTION

Best Mode for Carrying Out the Invention

Figure 1:
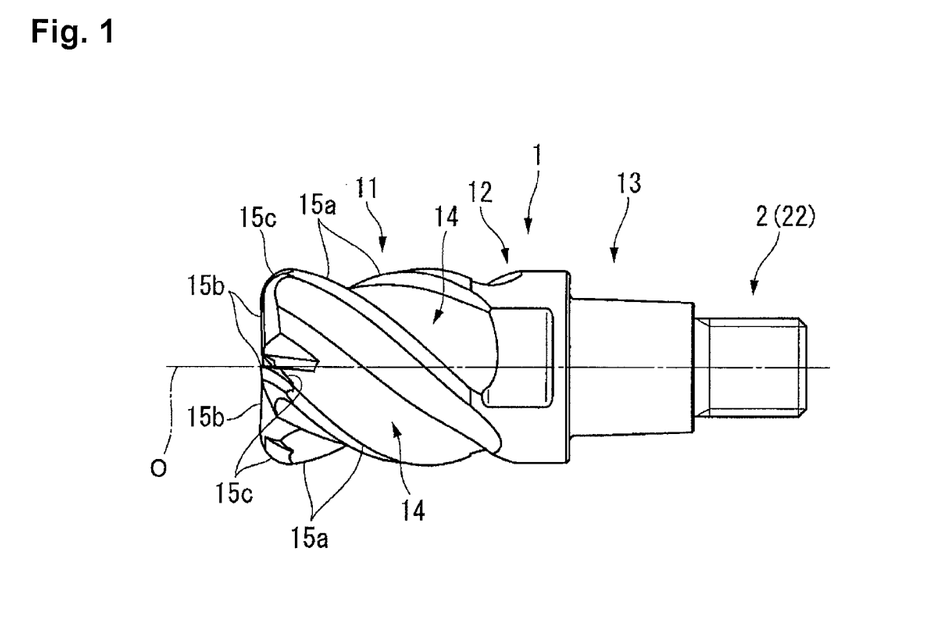
FIG. 1 is a side view of a head body that is an embodiment of the invention.
Figure 2:
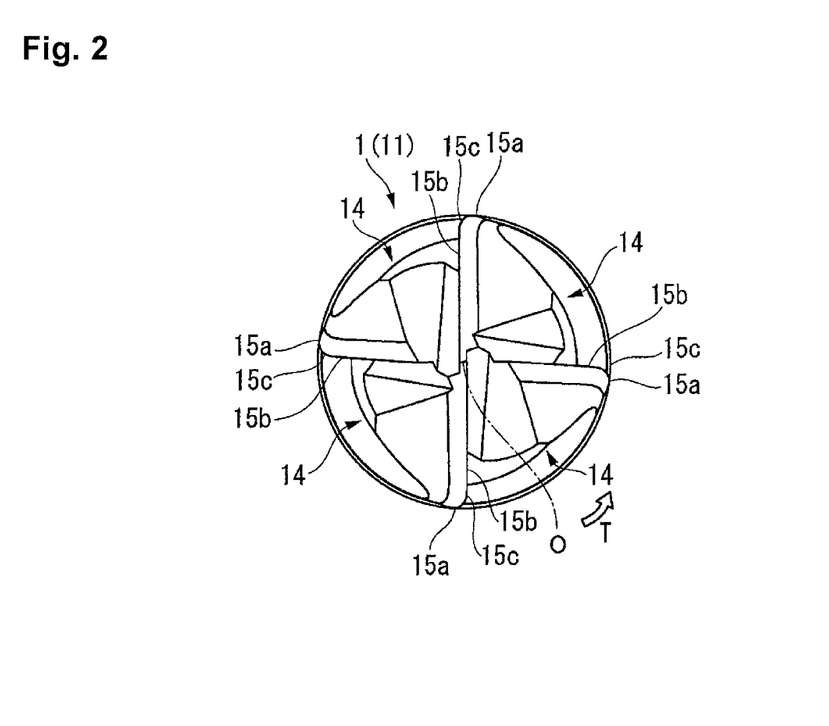
FIG. 2 is a front view of the embodiment shown in FIG. 1.

FIGS. 1 to 6 are views showing an embodiment in which the invention is applied to a cutting head that is detachably mounted on a holder as a replaceable head cutting tool and forms an end mill. As shown in FIG. 1, the cutting head includes a head body 1 as a tool body of this embodiment and a coupling member 2 that is joined to the head body 1. The head body 1 is integrally made of a hard material, such as cemented carbide, cermet, or ceramics. The coupling member 2 is made of a steel material, such as stainless steel or die steel, having hardness lower than the hardness of the hard material forming the head body 1, that is, a plastically deformable metal material.

As described below, the cutting head, which forms the end mill, is coupled and mounted on a front end portion of the holder (not shown), which has the shape of a cylindrical shaft, through the coupling member 2 so as to be coaxial with a center line O of the head body 1 (a center line of a mounting hole to be described below in this embodiment), and the holder is mounted on a spindle of a machine tool and is generally fed in a direction intersecting with the center line O while being rotated about the center line O in an end mill rotation direction T. Accordingly, cutting is performed on a work material.

A cutting edge portion 11 on which cutting edges are formed, an engagement portion 12 with which a wrench or the like is engaged at the time of the replacement of the cutting head, and a truncated cone-shaped tapered shaft portion 13 of which an outer diameter is smaller than the outer diameters of the cutting edge 11 and the engagement portion 12 and is gradually reduced toward a rear end side and which has a center line O as an axis are formed on the head body 1 from a front end side (a left side in FIG. 1) toward a rear end side (a right side in FIG. 1) in this order as shown in FIG. 1. Meanwhile, an inclination angle formed between the outer peripheral surface of the tapered shaft portion 13 and the center line O is preferably in the range of 1° to 20°, more preferably in the range of 1° to 5°, and most preferably in the range of 1° to 3°. In this embodiment, the inclination angle formed between the outer peripheral surface of the tapered shaft portion 13 and the center line O is set to 2°.

A plurality of (four in this embodiment) chip discharge grooves 14, which are twisted about the axis O toward the rear side in an end mill rotation direction T, are formed on the outer periphery of the cutting edge 11 from the front end of the head body 1 toward the rear end side at regular intervals in a circumferential direction; outer peripheral cutting edges 15a are formed at outer peripheral ridge portions of these chip discharge grooves 14 as the cutting edges; and, likewise, bottom cutting edges 15b are formed at ridge portions of the front end portions of the chip discharge grooves 14 as the cutting edges. Meanwhile, the end mill of this embodiment is a radius end mill, and corner cutting edges 15c, which form the shape of a convex curve such as a quarter of a circular arc, are formed at corner portions where the outer peripheral cutting edges 15a intersect with the bottom cutting edges 15b. Accordingly, the plurality of (four) cutting edges, which include the outer peripheral cutting edges 15a, the bottom cutting edges 15b, and the corner cutting edges 15c, are formed on the head body 1.

Figure 3:
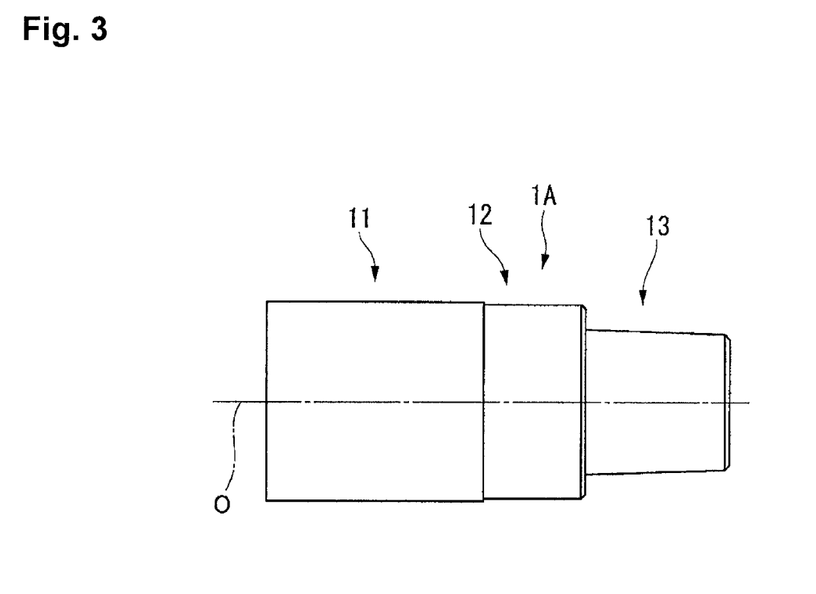
FIG. 3 is a side view of a head body material that is to be manufactured into the head body of the embodiment shown in FIG. 1.
Figure 4:
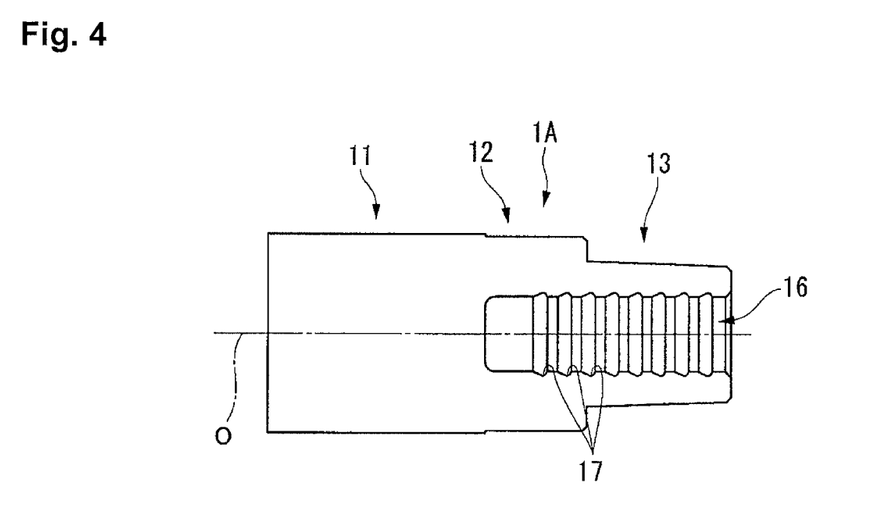
FIG. 4 is a cross-sectional view of the head body material shown in FIG. 3.
Figure 5:
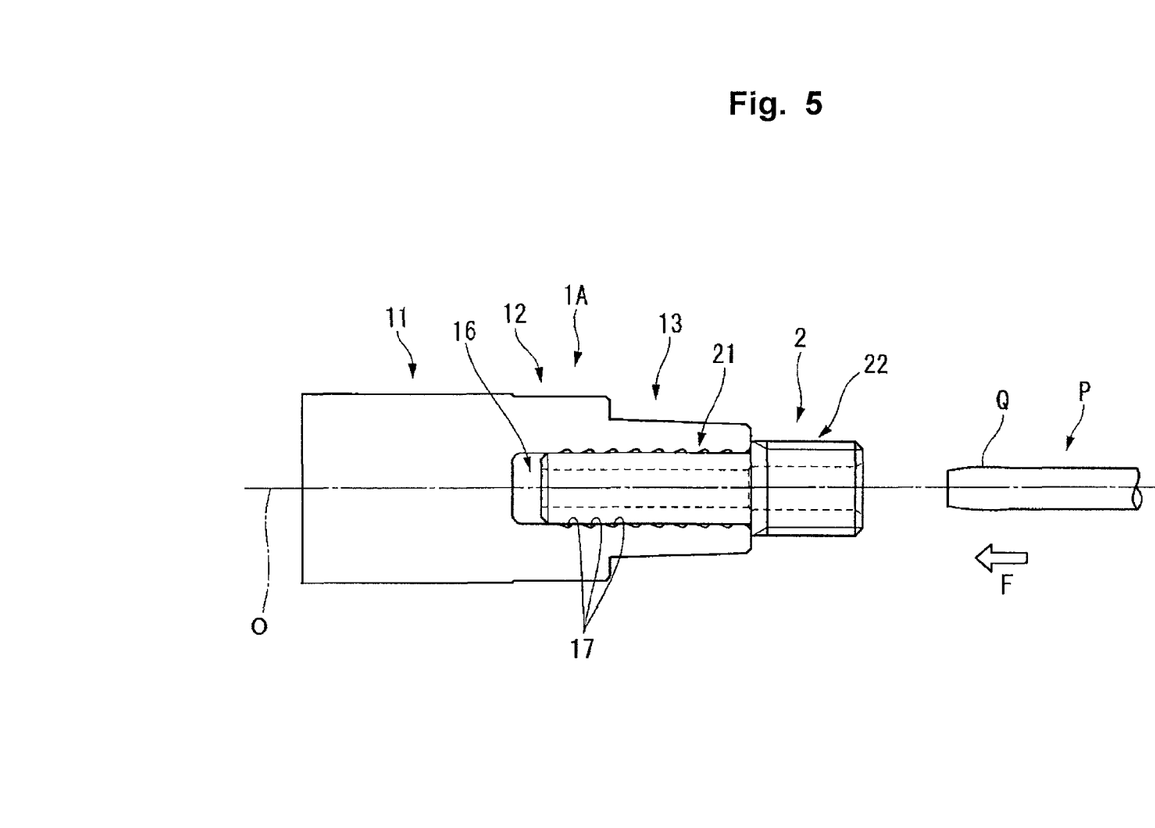
FIG. 5 is a partial cross-sectional side view when a coupling member is inserted into the head body material shown in FIG. 1 and is plastically deformed by a punch.

FIGS. 3 and 4 are views showing a head body material 1A that is a material of the head body 1 on which the chip discharge grooves 14, the outer peripheral cutting edges 15a, the bottom cutting edges 15b, and the corner cutting edges 15c are not yet formed. After the coupling member 2 is inserted and joined to the head body material 1A, which is manufactured by the sintering or the like of the above-mentioned hard material, as shown in FIG. 5, the chip discharge grooves 14, the outer peripheral cutting edges 15a, the bottom cutting edges 15b, and the corner cutting edges 15c of the cutting edge are formed. Accordingly, the head body material 1A is manufactured into the head body 1. Meanwhile, in FIGS. 3 and 5, for the purpose of description, the portions of the head body material 1A, which are to be formed into the cutting edge 11, the engagement portion 12, and the tapered shaft portion 13 of the head body 1, are denoted by the same reference numerals.

A mounting hole 16, which is opened to the rear end face of the tapered shaft portion 13 as shown in FIGS. 4 and 5 and extends toward the front end side, is formed along the center line O in the head body material 1A so that the cross-section of a portion of the mounting hole 16 except for a concave portion to be described below has a circular shape having a center on the center line O and a constant inner diameter. In addition, a plurality of (eight in this embodiment) annular grooves 17, which go around the center line O, are formed as the concave portion of this embodiment at regular intervals on the inner peripheral surface of the mounting hole 16 from the rear end face of the tapered shaft portion 13 and the bottom of the mounting hole 16 as shown in FIG. 4. The annular grooves formed in at least the front end portion (two annular grooves formed at the front end portion in this embodiment) are formed at positions, which correspond to the engagement portion of the head body 1, in the head body material 1A in the direction of the center line O.

Meanwhile, as shown in FIG. 5, a substantially cylindrical mounting unit 21 having a center on the center line O is formed at the front end portion of the coupling member 2, a male screw portion 22 of which a diameter is larger than the diameter of the mounting unit 21 is coaxially and integrally formed at the rear end portion of the coupling member 2, the outer diameter of the mounting unit 21 is set to be slightly smaller than the inner diameter of the mounting hole 16 in a state in which plastic deformation does not yet occur, and the outer diameter of the male screw portion 22 is set to be larger than the inner diameter of the mounting hole 16 and smaller than the outer diameter of the rear end face of the tapered shaft portion 13. Meanwhile, the twist direction of the male screw portion 22 is set to a direction opposite to the end mill rotation direction T.

Further, an inner peripheral portion of the cylindrical mounting unit 21 passes through the male screw portion 22 and is opened to the rear end face of the coupling member 2. However, in a state shown in at least FIG. 5 in which plastic deformation does not yet occur, the inner diameter of an inner peripheral portion of the coupling member 2 at the mounting unit 21 is slightly smaller than that at the male screw portion 22. Furthermore, the length of the mounting unit 21 in the direction of the axis O is set to a length that is smaller than the depth of the mounting hole 16 as shown in FIG. 5 and goes beyond the annular groove 17 formed at the foremost end of the mounting hole 16 when the front end face of the male screw portion 22 comes into contact with the rear end face of the tapered shaft portion 13.

Figure 6:
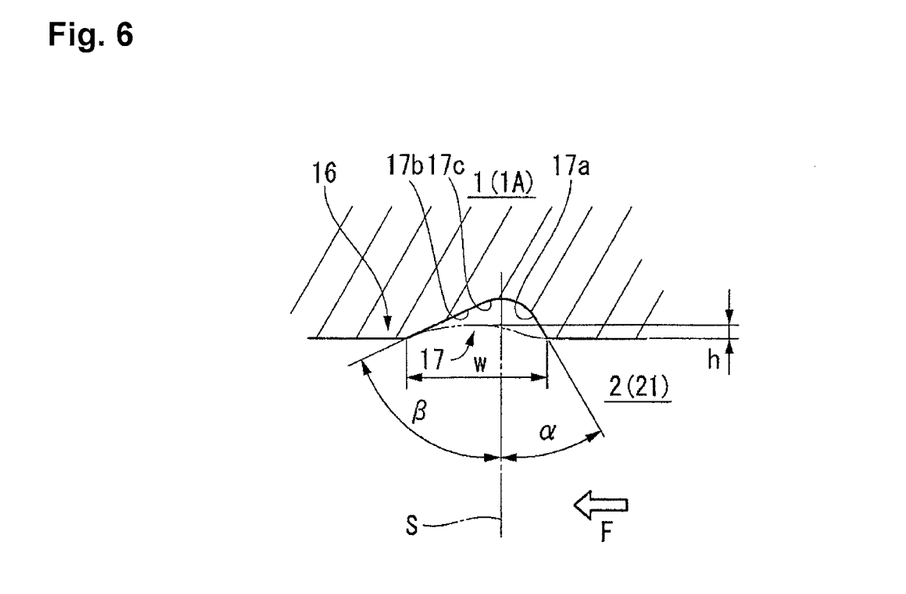
FIG. 6 is an enlarged cross-sectional view of a concave portion of the embodiment shown in FIG. 1.

The mounting unit 21 is inserted into the mounting hole 16 of the head body material 1A, and a punch P is press-fitted into the inner peripheral portion of the male screw portion 22 in the same press-fitting direction F as an insertion direction in which the coupling member 2 is inserted into the mounting hole 16, as shown in FIG. 5 by an arrow, when the front end face of the male screw portion 22 comes into contact with the rear end face of the tapered shaft portion 13, as described above. Accordingly, the mounting unit 21 is plastically deformed so as to increase in diameter. Therefore, the outer peripheral surface of the mounting unit 21 comes into close contact with the inner peripheral surface of the mounting hole 16, and is engaged with the annular grooves 17 by entering the annular grooves 17, as shown in FIG. 6 by a broken line, at the positions of the annular grooves 17 that are the concave portion. As a result, the coupling member 2 is joined to and mounted on the head body material 1A.

Here, in this embodiment, the punch P is made of a metal material, such as tool steel or bearing steel, which has hardness higher than the hardness of the coupling member 2 and equal to or lower than the hardness of the head body 1, and may be made of a hard material, such as cemented carbide, cermet, or ceramics, similar to the head body 1. Further, the punch P includes a pressing portion Q which has a diameter larger than the inner diameter of the inner peripheral portion of the mounting unit 21 of the coupling member 2 not plastically deformed and smaller than the inner diameter of the inner peripheral portion of the male screw portion 22 and is formed at the front end portion of the punch and of which a cross-section taken along the center line O has the shape of a convex curve. After the coupling member 2 is joined to the head body material 1A, the punch P is extracted from the inner peripheral portion of the mounting unit 21.

Further, the annular groove 17 as the concave portion of this embodiment, where the outer peripheral surface of the mounting unit 21 of the coupling member 2 enters by the plastic deformation, as described above, includes a first wall surface 17a that is inclined toward the outer peripheral side as the first wall surface moves in the insertion direction in which the mounting unit 21 is inserted into the mounting hole 16 as shown in FIG. 6 (the press-fitting direction F of the punch P), and a second wall surface 17b that is opposite to the first wall surface 17a and is inclined toward the inner peripheral side as the second wall surface moves in the insertion direction. A first inclination angle $\alpha$ formed between the first wall surface 17a and a plane S, which is perpendicular to the center line O of the mounting hole 16, at a position where the first wall surface 17a intersects with the inner peripheral surface of the mounting hole 16 is set to be smaller than a second inclination angle $\beta$ formed between the second wall surface 17b and the plane S at a position where the second wall surface 17b intersects with the inner peripheral surface of the mounting hole 16.

Meanwhile, in this embodiment, these first and second wall surfaces 17a and 17b have the shape of a straight line in the cross-section taken along the center line O and intersect with the inner peripheral surface of the mounting hole 16, angles formed between these straight lines and the plane S are first and second inclination angles $\alpha$ and $\beta$, and a groove bottom portion 17c of the annular groove 17 where these straight lines intersect with each other forms the shape of a concave curve, such as a circular arc, which is tangent to both the straight lines in the same cross-section. It is preferable that the first inclination angle $\alpha$ be set to 45° or less, and the first inclination angle $\alpha$ is set to 30° in this embodiment. Further, it is preferable that the second inclination angle $\beta$ be set to 45° or more, and the second inclination angle $\beta$ is set to 65° in this embodiment. Of course, the first and second inclination angles $\alpha$ and $\beta$ are not set to 45° at the same time.

As described above, the chip discharge grooves 14, the outer peripheral cutting edges 15a, the bottom cutting edges 15b, and the corner cutting edges 15c are formed on the head body material 1A on which the coupling member 2 is mounted in this way, so that the head body material 1A is manufactured into the head body 1. Since the male screw portion 22 of the coupling member 2 is threadedly attached to a female screw portion formed on an inner peripheral portion of a front end portion of the holder, the rear end face of the engagement portion 12 comes into contact with the front end face of the holder and the outer peripheral surface of the tapered shaft portion 13 comes into contact with the inner peripheral surface of a tapered hole that is formed between the female screw portion and the front end face of the holder and gradually increases in diameter toward the front end side. Accordingly, the head body 1, which is manufactured in this way, is coupled to the holder and is used for cutting.

In the cutting head that is the replaceable head cutting tool having the above-mentioned structure, the first inclination angle $\alpha$ formed between the first wall surface 17a of the annular grooves 17, which is the concave portion, and the plane S, which is perpendicular to the center line O, is smaller than the second inclination angle $\beta$ formed between the second wall surface 17b and the plane S, and conversely, the inclination angles formed between the second wall surface 17b and the center line O and the inner peripheral surface of the mounting hole 16 extending parallel to the center line O are smaller than the inclination angles formed between the first wall surface 17a and the center line O and the inner peripheral surface of the mounting hole 16 extending parallel to the center line O. For this reason, even though the depth of the annular groove 17 is not set to be large, the width w of the annular groove 17 in the direction of the center line O can be set to be large, as shown in FIG. 6, and the amount h of plastic deformation, which means the length of a portion of the outer peripheral surface of the mounting unit 21 entering the annular groove 17 when the punch P is press-fitted to plastically deform the mounting unit 21 of the coupling member 2, can be set to be large.

Further, the first wall surface 17a, which forms a large inclination angle between itself and the inner peripheral surface of the mounting hole 16, is formed on the rear side of the annular groove 17, where the outer peripheral surface of the mounting unit 21 enters with a large amount h of plastic deformation in this way, in the press-fitting direction (the insertion direction in which the mounting unit 21 is inserted into the mounting hole 16) F. Accordingly, the outer peripheral surface of the mounting unit 21, which enters the annular groove 17 with a large amount, is firmly caught by the first wall surface 17a, so that the strength of engagement can be increased and a high resistance force can be obtained with respect to a load in a direction in which the coupling member 2 is extracted when the head body is mounted on the holder, as described above, and is used for cutting.

Further, since the width w can be increased even though the annular groove 17 is formed not to have a large depth, it is possible to ensure the thickness of the head body 1 between the groove bottom portion 17c of the annular grooves 17 and the outer peripheral surface of the head body 1. Since the head body 1 or the head body material 1A is made of a hard material such as cemented carbide, damage, which is caused by cracks generated toward the outer peripheral surface from the groove bottom portion 17c, does not occur in the head body 1 or the head body material 1A, which also has a strong tendency of brittleness, when the punch P is press-fitted, the head body is mounted on the holder, or cutting is performed. Furthermore, if the depth of the concave portion is constant, notched portions of the inner peripheral surface of the mounting hole 16 of the head body 1 or the head body material 1A may be made small as compared to a case in which the concave portion is formed to have a semi-oval cross-section. Accordingly, it is possible to ensure the strength of these notched portions.

Meanwhile, the second inclination angle β of the second wall surface 17b, which is positioned on the side toward which the punch P is press-fitted in the press-fitting direction F, is set to be larger than the first inclination angle, so that the inclination of the second wall surface 17b toward the inner peripheral surface of the mounting hole 16 is gentle. Accordingly, even though the outer peripheral surface of the mounting unit 21 enters the annular grooves 17 with a large amount h of plastic deformation, as described above, the second wall surface 17b is not firmly caught unlike the first wall surface 17a. For this reason, it is also possible to prevent the breakage of the punch P that occurs since the punch P in the press-fitting direction F is excessively firmly caught when the punch P is press-fitted and a load applied to the punch P toward the rear side in the press-fitting direction F is excessively increased due to the reaction thereof.

Meanwhile, in this embodiment, not only the second wall surface 17b but also the first wall surface 17a has the shape of a straight line in the cross-section taken along the center line O. However, the second wall surface 17b may have the shape of a curve convex toward the inner peripheral side of the mounting hole 16 in the same cross-section as in a modification shown in FIG. 7 and may be inclined toward the inner peripheral side as the second wall surface 17b moves in the insertion direction (press-fitting direction F). In this modification, the second wall surface 17b, which has the shape of a convex curve in the cross-section, intersects with the inner peripheral surface of the mounting hole 16 at an angle, the first inclination angle α is set to 30° as in the embodiment, and the second inclination angle β is set to 80°.

Figure 7:
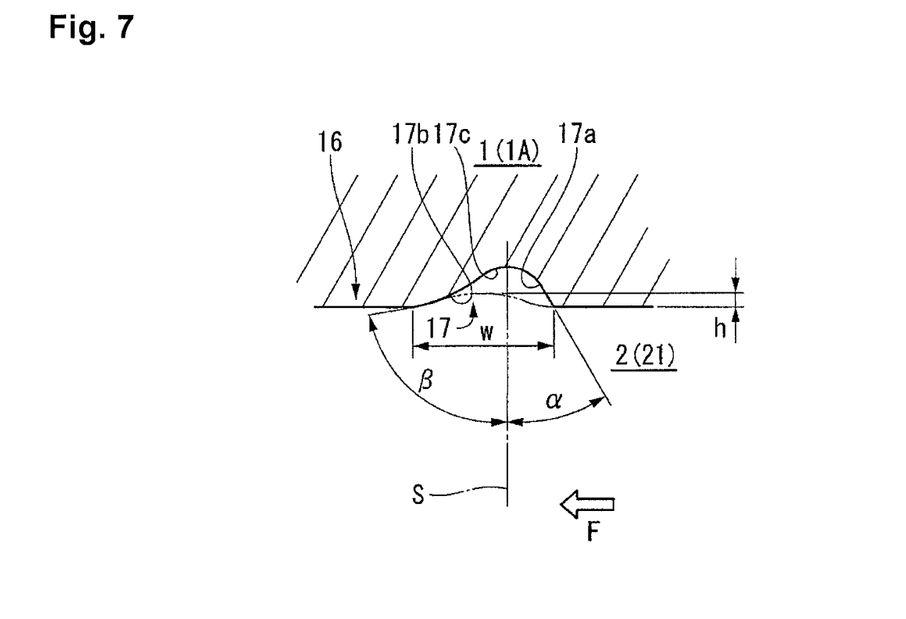
FIG. 7 is an enlarged cross-sectional view showing a modification of the concave portion shown in FIG. 6.

In a replaceable head cutting tool including the annular grooves (concave portion) 17 of this modification, since an inclination of the second wall surface 17b relative to the inner peripheral surface of the mounting hole 16 gradually becomes gentle toward a position where the second wall surface 17b intersects with the inner peripheral surface of the mounting hole 16, it is possible to further suppress the catch of the outer peripheral surface of the mounting unit 21 that has been plastically deformed. Accordingly, it is also possible to further reduce a load that is applied to the punch P. Further, if the depth of the annular groove 17 (concave portion) is constant, notched portions of the head body 1 or the head body material 1A can be made small as compared to a case in which the second wall surface 17b has a linear cross-section. Accordingly, it is possible to further improve the strength of the head body 1 or the head body material 1A.

Meanwhile, in order to reliably obtain these effects, it is preferable that the first inclination angle α be set to 45° or less and the second inclination angle β be set to 45° or more as in the embodiment or the modification of the embodiment. When the first inclination angle α is larger than 45°, an inclination of the first wall surface 17a relative to the inner peripheral surface of the mounting hole 16 becomes gentle. For this reason, there is a concern that the outer peripheral surface of the plastically deformed mounting unit 21 may not be firmly caught and the strength of engagement may not be increased. When the second inclination angle β is smaller than 45°, an inclination of the second wall surface 17b relative to the inner peripheral surface of the mounting hole 16 is large. For this reason, there is a concern that the outer peripheral surface of the mounting unit 21 may be firmly caught and a load at the time of the press-fitting of the punch P may be increased.

Further, in the embodiment and the modification, the annular grooves 17, which go around the center line O, are formed on the inner peripheral surface of the mounting hole 16 to form the first and second wall surfaces 17a and 17b. However, one groove or a plurality of grooves, which are divided in a circumferential direction, may be used as the concave portion. Furthermore, spiral grooves may be used instead of the annular grooves 17. In this case, a plurality of spiral grooves of which twist directions are different from each other may be formed so as to intersect with each other or without intersecting with each other. Moreover, one recess or a plurality of recesses dotted on the inner peripheral surface of the mounting hole 16 are formed instead of the grooves, and may be used as the concave portion including the above-mentioned first and second wall surfaces 17a and 17b.

Meanwhile, a case in which the coupling member 2 is joined to the head body 1 of the replaceable head cutting tool as a tool body has been described in the embodiment and the modification. However, the invention can be applied to a structure in which a tool body made of a hard material is used as a holder body of a holder on which the head body 1 is mounted, the female screw portion formed in the holder is formed in the coupling member, and the coupling member is joined to the holder body. In this case, the inner diameter of the inner peripheral portion of a mounting unit of a coupling member, which is inserted into a mounting hole formed in the holder body, is set to be smaller than the inner diameter of the female screw portion and the punch P is press-fitted to the inner peripheral portion of the mounting unit, the mounting unit is plastically deformed and the coupling member is joined to the holder body.

The invention claimed is:

1. A replaceable head cutting tool comprising:
a tool body having a mounting hole having a cylindrical inner peripheral surface; and
a coupling member having a cylindrical mounting unit to be inserted into the mounting hole along an insertion direction, wherein
the tool body includes, from a front end to a rear end thereof, a cutting edge portion on which cutting edges are provided, an engagement portion on which a wrench can be engaged, and a shaft portion having an outer diameter smaller than outer diameters of the cutting edge portion and the engagement portion,
the mounting hole opens at the rear end of the shaft portion and is extended toward the cutting edge portion,
the coupling member is made of a metal material having a hardness lower than the hardness of a hard material of the tool body,
a plurality of concave portions are provided on the inner peripheral surface of the mounting hole at intervals in the insertion direction,
the plurality of the concave portions includes a first concave portion at a front end thereof, which is positioned inside the engagement portion,
each of the concave portion has a first wall surface that is inclined outwardly along the insertion direction, and a second wall surface that is opposite to the first wall surface and is inclined inwardly along the insertion direction,
the first wall inclines a first inclination angle with respect to a perpendicular plane perpendicular to the insertion direction at a position where the first wall intersects with the inner peripheral surface of the mounting hole,
the second wall inclines a second inclination angle with respect to the perpendicular plane at a position where the second wall intersects with the inner peripheral surface of the mounting hole,
the first inclination angle is smaller than the second inclination angle,
the mounting unit is inserted in the mounting hole,
the mounting unit is enlarged in diameter so that an outer peripheral surface of the mounting unit contacts the inner peripheral surface of the mounting hole and is engaged with the plurality of the concave portions, and
the tool body and the coupling member are joined to each other.

2. The replaceable head cutting tool according to claim 1, wherein the second inclination angle is set to 45° or more.

3. The replaceable head cutting tool according to claim 1, wherein the first inclination angle is set to 45° or less.

4. The replaceable head cutting tool according to claim 1, wherein the second wall surface has the shape of a curve convex toward the inner peripheral side of the mounting hole in a cross-section taken along the center line.

5. The replaceable head cutting tool according to claim 2, wherein the first inclination angle is set to 45° or less.

6. The replaceable head cutting tool according to claim 2, wherein the second wall surface has the shape of a curve convex toward the inner peripheral side of the mounting hole in a cross-section taken along the center line.

7. The replaceable head cutting tool according to claim 3, wherein the second wall surface has the shape of a curve convex toward the inner peripheral side of the mounting hole in a cross-section taken along the center line.

8. The replaceable head cutting tool according to claim 5, wherein the second wall surface has the shape of a curve convex toward the inner peripheral side of the mounting hole in a cross-section taken along the center line.

9. The replaceable head cutting tool according to claim 1, wherein each of the concave portions is an annular groove going around a center line of the mounting hole.

10. The replaceable head cutting tool according to claim 1, wherein the tool body is made of cemented carbide, cermet, or ceramics.

* * * * *